(12) United States Patent
Kozlov et al.

(10) Patent No.: US 6,728,645 B1
(45) Date of Patent: Apr. 27, 2004

(54) METHOD AND SYSTEM FOR AUTOMATIC IDENTIFICATION OF OBJECTS TYPE ACCORDING TO THEIR CHARACTERISTIC SPECTRUM OF VIBRATION FREQUENCIES

(75) Inventors: Inna Kozlov, Haifa (IL); Shimon Peled, Kiryat Haim (IL); Zvi Zlotnick, Haifa (IL); Ran Kaftory, Haifa (IL); Eitan Zeiler, Haifa (IL)

(73) Assignee: Electro-Optics Research & Development Ltd., Haifa (IL)

( * ) Notice: Subject to any disclaimer, the term of this patent is extended or adjusted under 35 U.S.C. 154(b) by 0 days.

(21) Appl. No.: 10/337,319

(22) Filed: Jan. 7, 2003

(51) Int. Cl.⁷ .................................................. G01P 3/36
(52) U.S. Cl. ........................ 702/56; 356/5.09; 356/28.5
(58) Field of Search .......................... 702/56, 179, 182; 356/28.5, 5.9; 342/192; 367/125

(56) References Cited

U.S. PATENT DOCUMENTS 5,192,979 A * 3/1993 Grage et al. ................ 356/28.5
5,847,816 A * 12/1998 Zediker et al. ............. 356/5.09
5,847,817 A * 12/1998 Zediker et al. ............. 356/5.09
5,867,257 A * 2/1999 Rice et al. .................. 356/28.5

OTHER PUBLICATIONS

Kozlov et al.; "Wavelet analysis for acoustic phased array"; INSPEC 2003/03 17:2L.443 (Abstract only).*

* cited by examiner

Primary Examiner—Kamini Shah
(74) Attorney, Agent, or Firm—Mark M. Friedman (57) ABSTRACT

A method and system for automatic recognition and classification of a vibrating target among members of a plurality of objects having their vibration spectra stored in a database. In deciding as to which member of an alleged couple of vibrating objects the target should be assigned, the method uses an algorithm of signal processing which is based on wavelet packet analysis to predict a-priory a bandwidth in which the differences between the vibration of the spectrum is mostly pronounced, and the resolution within the bandwidth which is adequate to enable the decision.

27 Claims, 4 Drawing Sheets

METHOD AND SYSTEM FOR AUTOMATIC IDENTIFICATION OF OBJECTS TYPE ACCORDING TO THEIR CHARACTERISTIC SPECTRUM OF VIBRATION FREQUENCIES

BACKGROUND OF THE INVENTION

The present invention relates to a method and system for the remote assessment of the vibrating state of an object in general, and to a method and system for target detection, recognition and identification using a Doppler Laser Radar (LADAR) device in particular.

Target acquisition has become an important task in the modem battlefield and future battlefield will demand an increased ability to acquire, transmit, process, disseminate and utilize surveillance and target acquisition information. Yet, because modem weapon systems can operate these days at long distances using sophisticated camouflage and concealment tactics, positive target identification has become actually more and more difficult to implement.

One relatively new source of intelligence information is remote monitoring of the battlefield, using Remotely Monitored Sensors (REMS).

REMS work on the principles of detection of an outside stimulus, logic processing of that stimulus and transmission of a coded signal to a readout device. The tactical unattended ground sensors used by REMS may include sensors, which operate on magnetic, seismic, acoustic, electromagnetic and audio detection principles.

Other attempts to acquire and characterize targets from long distance include electro-optical methods, both passive and active. Among the active optical techniques, it has been known that Doppler LADAR either continuous-wave (CW) or pulsed, can be used to measure distance to objects, the velocities of moving objects and to detect characteristic pattern of the vibration frequencies of the body of an active vibrating target.

Electro-optical systems for detecting the vibration frequencies of an object are referred as Doppler LADAR systems. Updated prior art with regard to Doppler LADAR systems and their method of operation can be found in U.S. Pat. Nos. 5,847,816 and 5,847,817 both to Zediker, et al., U.S. Pat. No. 5,867,257 to Rice, et al. and in the relevant literature such as e.g.: in *Procceding of SPIE* 4035, 436 (2000); P. Gatt, et al. "Micro-Doppler Lidar Signals and Noise Mechanisms; Theory and Experiment" in *Procceding of SPIE* 4035, 426 (2000); V. N. Glazov, et al. "Analysis of Doppler Laser Radar for identification of dynamic object" in *Procceding of SPIE* 4035, 311 (2000); J. F. Fontannella, et al. "Wavelength selection for long range laser vibrating sensing" in *Procceding of SPIE* 3380, 107 (1998); B. Lyons, et al. "Upgrades Defense Laser Target Signature Code for the Evaluation of Advanced LADAR Technologies" in *Procceding of SPIE* 3380, 164 (1998) and S. H. Hannon, et al. "Agile Multiple Pulse Coherent Lidar for Range and Micro-Doppler Measurements" in *Procceding of SPIE* 3380, 259 (1998).

In a typical Doppler LADAR system optical detection starts with illuminating a vibrating or moving target with an intermediate frequency (IF) modulated coherent laser beam of a LADAR. The surface vibrations of that active target further modulate the impinging IF modulated LADAR laser beam frequency, a part of which is reflected back towards the LADAR detector where it interferes with a local reference beam.

The resultant interference products contain a vibration frequency modulated IF component, where the modulation is by the exact Doppler frequency shift of the reflected beam with respect to the reference beam. This modulated IF component is later filtered out in the receiver, to be further analyzed by the LADAR signal processor to extract the vibration frequency features.

Because of improvements in hardware of LADAR systems, e.g. as the transition from the gas laser to the solid state laser, or the use of light pulslets, Doppler LADARs are capable of measuring a surface displacement velocity within a resolution as small as 10 micrometers per second and can thus be used to classify and identify targets based on the vibration signature of a target at a high degree of fidelity at ranges of over 20 km (W. Otaguro, et al.).

Yet the method of processing of the vibration spectrum of a target has little changed over the years and is mainly based on the extracting of the frequency power spectrum of the modulated IF component using the Fourier transform (FT).

The main drawback of fixed windowed FT is that the spatial and frequencies resolutions are fixed and a local feature having a frequency band cannot be located with a precision higher than the frequency width of the window function.

Besides, FT is appropriate for analyzing stationary or quasi stationary signals, but when a signal becomes non stationary or transient because e.g. drift, trends, abrupt changes or beginning and ends of events, information in regard to the order of the events is lost, i.e. it is not known when a particular event took place.

In order to overcome this difficulty of the FT analysis, the technique of short time Fourier transform (STFT) was introduced by Denis Gabor (1946) in which small section of a signal are analyzed each at a time by moving along different sections the signal windows which have different sizes.

Even so, because spatially unresolved vibration signatures, e.g. of a vehicle, depend on range and aspect angle, on engine condition, on the velocity of the vehicle and on the exact location of the laser beam on target, identification becomes complex and requires a more flexible approach of data analysis, so it will be possible vary the window "shape" in addition to the change of its size (as in the STFT), in order to make the most favorable trade-offs between time and frequency resolutions of the signal.

The technique of wavelet packet analysis of signals provides such approach and its application in Doppler LADAR vibrometry is described e.g. in G. A. Harrison, et al. "*Application of wavelet and Wigner analysis to gas turbine vibration signal processing*", SPIE 3391, 490, (1999).

When it comes to an automatic identification and classification of targets in accordance to their vibration spectrum, two more difficulties are encountered:

The first one is the assignment of an immutable vibration signature to an object regardless its momentarily vibrating state. This is demonstrated in FIG. 1 to which reference is now made.

Figure 1:
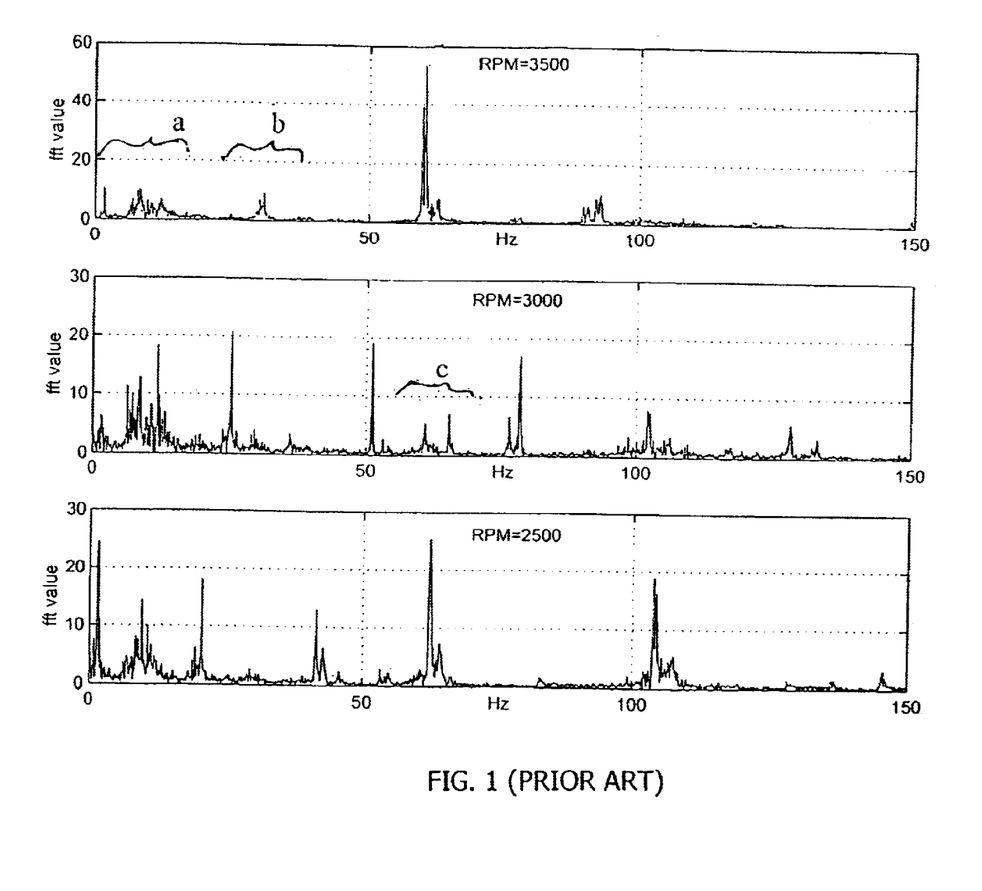
FIG. 1 shows the FT power spectra of vibrations of a truck at three RPM values of its engine.

Shown in FIG. 1 are the FT frequency power spectra of the vibration of a door of a truck at three different RPM values of the car's engine, which were measured by a commercial Doppler LADAR vibrometer.

As is seen, although the FT frequency power spectrum of the truck differs in the three RPM values, the spectra include some characteristic features which are invariant and only these features should be utilized for the positive identification of the car type regardless its vibrating state.

In the example shown in FIG. 1 these characteristic features include e.g. the power spectrum band structure in the frequency intervals marked as a, b and c.

Figure 2:
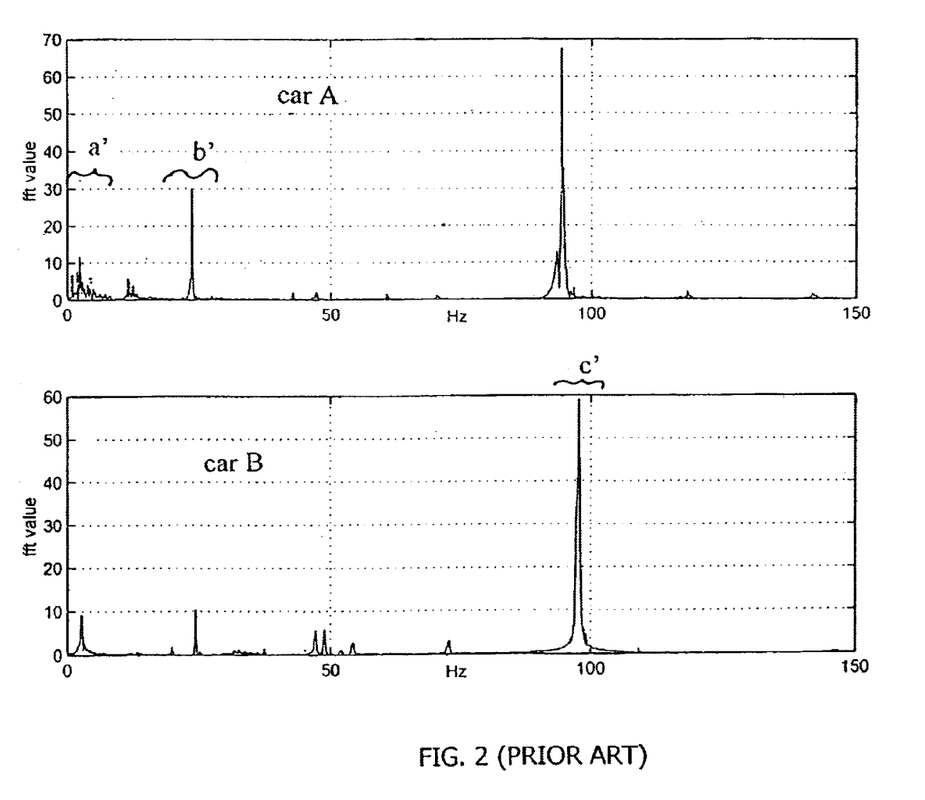
FIG. 2 compares FT power spectrum of car A and of car B.

The second difficulty is demonstrated in FIG. 2 to which reference is now made.

Shown in FIG. 2 are the frequency power spectra of car A and car B, which should be distinguished in accordance to their vibration spectra.

As can be seen in FIG. 2, there are at least three frequency bands (marked as a', b' and c') in which the differences between the spectra of the cars are mostly pronounced, while the other part of the spectra are relatively irrelevant to the differentiation between the cars.

Besides, it is apparent that the spectral resolution needed to differentiate among the cars in accordance to frequency band a' is greater than the resolution which is needed to resolve the differences between the cars in accordance to frequency band c'.

I.e. it will be wasteful to analyze the vibrations in frequency band a' and in frequency band c' with the same resolution (the same degree of Fourier approximation of the signal).

Both difficulties reflect nowadays limitations of an automatic method for recognition and classification of a suspected target in Doppler vibrometry, wherein it is needed to compare an immutable feature of a vibration of a target with thousands of vibration spectra of objects stored in a database.

A-priori knowing which frequency bands carry the immutable characteristics of a target, and the a-priori knowing the spectral resolution needed for the comparison of the vibration of a target to the vibrations of alleged objects are highly needed.

It is the purpose of the present invention to provide such a need by introducing an improved method and system to identify objects in accordance to their vibration spectrum.

SUMMARY OF THE INVENTION

The present invention uses the frequency demodulation processing known as wavelet analysis in order to extract immutable frequency features of a vibrating target at preselected relevant frequency bands at the lowest possible resolution.

In accordance with the present invention there is provided a method for an automatic classification of a target among a plurality of objects according to the target vibration in the audio frequency range, the method comprises the stages of: (a) providing a vibration signal from a first object and a second object; (b) processing at least a portion of said vibration signal of both said first and said second object by a wavelet packet transform; (c) identifying at least one most discriminating frequency band in which a difference between vibration spectrum of said first object and said second object are mostly pronounced; (d) choosing a spectral resolution for which a difference between vibration spectrum of said first object and said second object cannot be further improved; (e) attributing immutable features to said vibration signal of each of the first and second object within said most discriminating frequency band at said spectral resolution; (f) acquiring a vibration signal from the target; (g) ascertaining vibration signature of the target within said most discriminating frequency band at said spectral resolution, and (h) assigning a probability for the target for being either said first or said second object in accordance to a correlation score of said vibrating signature of the target with said immutable features of said vibration signal of both said first object and said second object.

In accordance with the present invention there is provided a Doppler Ladar vibrometry system for automatic classification of a target among a plurality of objects, comprising of: (a) a Doppler Ladar device to acquire a vibration signal of the target; (b) a database which includes wavelet packet transform coefficients of vibration signatures of a plurality of objects; (c) a first mechanism to establish a most discriminating frequency band in which maximum distinction exists between vibration spectrum of members of a couple of objects which is selected from said plurality of objects; (d) a second mechanism for choosing a spectral resolution for which a difference between said vibration spectrum of said first object and said second object within said best discriminating frequency band cannot be further improved; (e) a third mechanism to extract a characteristic feature of the vibration signature of the target within said most discriminating frequency band at said spectral resolution, and (f) a fourth mechanism to classify the target among said members of said couple of objects in accordance to a correlation score between said characteristic feature of said vibration signature of the target, and an immutable characteristic in said vibration signature of either of said objects of said couple of objects within said most discriminating frequency band.

It is a further object of the present invention to classify concealed targets.

It is yet another object of the present invention to distinguish between a friend and a foe.

Other objects and goals of the present invention will become apparent upon reading the following description in conjunction with the following figures.

DETAILED DESCRIPTION OF THE EMBODIMENTS

In the present invention the optical signal which results from differences between the returning laser beam and the local reference laser beam of the LADAR is analyzed by wavelet processing.

Wavelets processing is a new emerging analysis technique, see e.g. Sibul, ct al. in "Generalized wavelets transforms and their applications" in *Procceding of SPIE* 3391, 502 (1998).

A wavelet is a waveform of effectively limited duration that has an average value of zero, so while Fourier transform analysis consists of breaking up a signal into sine waves of various frequencies, the wavelet analysis consists of breaking up a signal into a packet of shifted and scaled versions of a fundamental wavelet function $\Psi$ (called: the mother wavelet).

The continuous wavelet transform (CWT) of a signal is defined as the integral over all time of the signal f(t), multiplied by a member of the wavelet function $\Psi$scale, position, (t).

When the signal has a discrete form f(n), the discrete dyadic wavelet transform of the signal at scale $2^j$ are inner products with discrete wavelets translated:

$$C_j(p) = <f(n), \Psi_j(n-p)>$$

The dyadic wavelet transform of the discrete signal f(n) is calculated through a cascade of filter bank convolutions with two filters h[n] and g[n], which for a signal of size N requires $O(N\log_2 N)$ operations, (see e.g. section 5.5.2 in S. Mallat, "A wavelet tour on signal processing", Acad. Press 1998).

The general procedure of choosing an appropriate mother wavelet function which is useful to represent a given signal and the performing of the wavelet packet transform are described in Appendix 1 to which reference is now made.

As was explained before in regard to FIG. 1, a crucial factor in having a successful identification (or discrimination) procedure is to reveal the invariant characteristic features of the vibration, hereinafter-the vibration signature of the object in pre-selected frequency bands.

The procedure of wavelet analysis produces a frequency time-scale view of the signal, which enables to analyze a localized area of a large signal.

The basic assumption is that the vibration signature is manifested in small sets of the energies of wavelet packet coefficients in frequency bands of the transform within the vibration of the signal The work with these bands instead of working with individual frequencies has significant advantages for signals constantly varying in time.

The algorithm for automatic classifying of a target in accordance to its vibration among a couple of objects using the wavelet analysis will now be detailed with the aid of an example shown in FIG. 2.

FIG. 2 to which reference was made before shows an FT transform of the vibration signals of a car A and of car B.

A human eye coupled to the human mind can select at a glance frequency ranges (discriminating bands) in which the difference between the vibration signals of car A and car B are mostly pronounced.

For an automatic selection of the discriminating bands between car A and car B, a wavelet packet analysis is carried out according to the description in Appendix 1, which only the principles of which are given below.

First the vibration signals of both car A and car B, which actually consist of the instantaneous velocity component of the vibrating surfaces with respect to the measuring device, are sampled separately at controlled conditions at an appropriate sampling rate of, e.g. 4096 $\sec^{-1}$.

Then the signals of both car A and car B in selected recordings are sliced identically into s slices (portions) of length n (s<n), which are shifted with respect to each other. Each couple of slices representing car A and B respectively is subjected to search of discriminating bands.

For this, the best analyzing waveforms for the vibration signals is chosen. Clearly, many possibilities for waveforms from the library of wavelet packets exist and the goal is finding the analyzing waveforms, referred hereafter as a basis that will be best adapted to the signal.

To accomplish the goal it is possible to utilize knowledge about the specific properties of the signal.

It should be noted that different signals may have different bases or, that the bases may be altered in order to tune the wavelet packet decomposition to certain regions of the signal. The preferred basis according to the present invention is a mother wavelet for the analyzing, which supplies sparse decomposition of the signal, i.e. the set of coefficient of the decomposition includes as few as possible members having large as possible values. This criterion for a selection of the best bases is referred as having "minimum entropy".

In the example given the wavelet packet transform of the vibration of car A and car B use the same analyzing waveforms (see Appendix 1).

Once the best analyzing waveforms are chosen, wavelet packet signal decomposition of each of the slices of vibration signals of car A and car B is performed as described in detail in Appendix 1. Such decomposition has some variants, which are considered as prior art.

Given below are only the essentials of the wavelet packet decomposition, which are needed to explain the invention through the example.

Practically the wavelet transform is implemented through multilevel iterated application of low (H) and high (G) conjugated pairs of filters to the signal followed by down sampling, wherein each pair of the filters at level j corresponds to the $2^{j-1}$ scale of the mother wavelet.

Beginning with filtering a slice of an experimental signal with the first level (the narrowest wavelet) H and G conjugated filters; two sets of correlation coefficients (corresponding to the wavelet transform coefficient of the first scale) are obtained.

These sets of coefficient are decimated and after decimation a first level "low pass" contribution (approximation) and a first level "high pass" contribution (details) to the experimental spectrum of the signal are reconstructed by combining the multiplications of the first scale wavelet with its respective wavelet transform coefficients at each set.

Both the first level high-pass and the first level low-pass contributions are now being treated as the experimental slice of the signal was treated before, i.e. it is filtered with two conjugated filters belonging to the second level and the appropriate two blocks of coefficients are calculated and decimated, a second level high-pass and second level low-pass contributions are now determined for each of both first level high-pass and the first level low-pass contributions and vice versa, decomposition of both the low pass contribution and high pass contribution at each level proceeds using subsequent growing wider wavelets, until a reconstructed contribution using the $j^{th}$ level of coefficients fits adequately to the $j^{th}-1$ contribution.

Figure 3A:
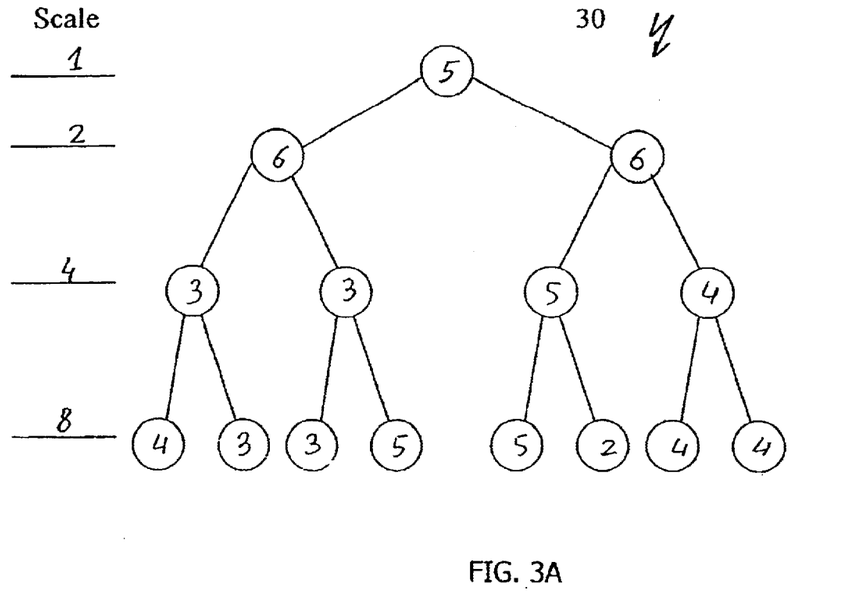
FIGS. 3A, and 3B show trees of power map of car A and car B.

An illustrative output of wavelet packet decomposition of a signal slice is a binary tree of power map with nodes shown in FIG. 3A to which reference is now made, each node corresponds to particular frequency band and confines a numerical value, which corresponds to the energy of the experimental signal, which is carried within this frequency band.

The range of the frequency bands included in a node of the wavelet decomposition extends from $N_F/2$ at the first level (scale=1) of the tree, wherein $N_F$ in the Nyquist frequency of the sample, to $N_F/j$ at level j (scale=$2^{j-1}$) of the tree of power map.

Each parent node (except the lowest ones) has two descendant nodes corresponding to the signal energy in the high-pass and low-pass frequency bands, which result from the wavelet decomposition of the signal in the parent node.

Thus, the nodes values are substantially analogues to the power term in the FT except that they represent the average power due to a frequency band rather than the power due to a discrete frequency.

A signal, which is segmented into several slices (portions) in time wherein each slice is wavelet packet analyzed separately, has its tree of power map for each slice.

The separate wavelet packet trees are combined into a complete tree of power map, which characterize the signal over a bigger period of time.

Figure 3B:
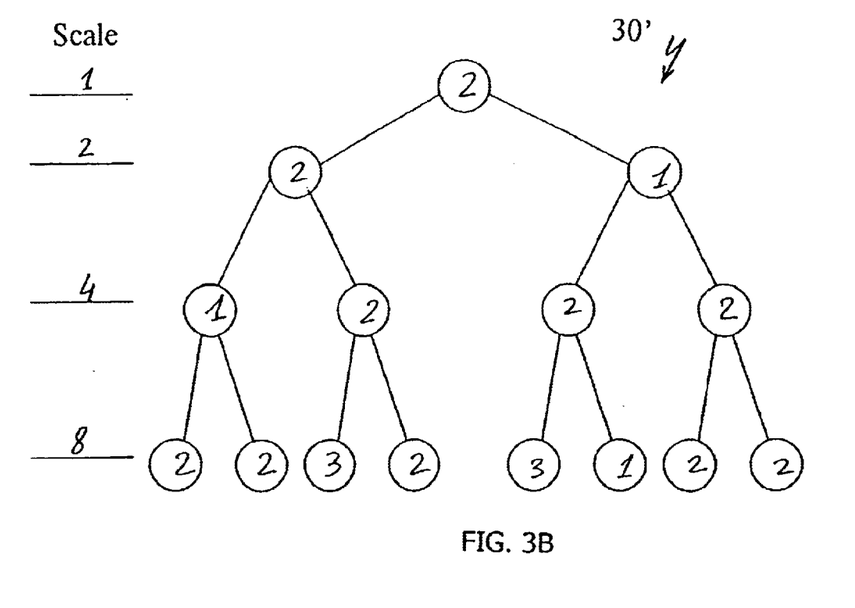

Examples of complete trees of power map, e.g. of car A and car B are shown in FIGS. 3A and 3B respectively.

The next step is to evaluate the discrimination power of the decomposition frequency bands between car A and B and the selection of the most discriminating bands.

The partition of the energy of the signal as reflected by the tree of power map yield some degree of characterization but is highly redundant since the frequency bands, which are included in a single tree overlap.

To gain a more concise and meaningful representation of the difference in the spectra of both cars, it is useful to identify the most discriminating frequency bands between them.

This is done by constructing a tree of discriminating power map which consists of a binary tree which is obtained by the term-wise subtraction of the respective nodes of the complete tree of power map of car A from the respective nodes of the complete tree of power map of car B (or vice versa).

Figure 4A:
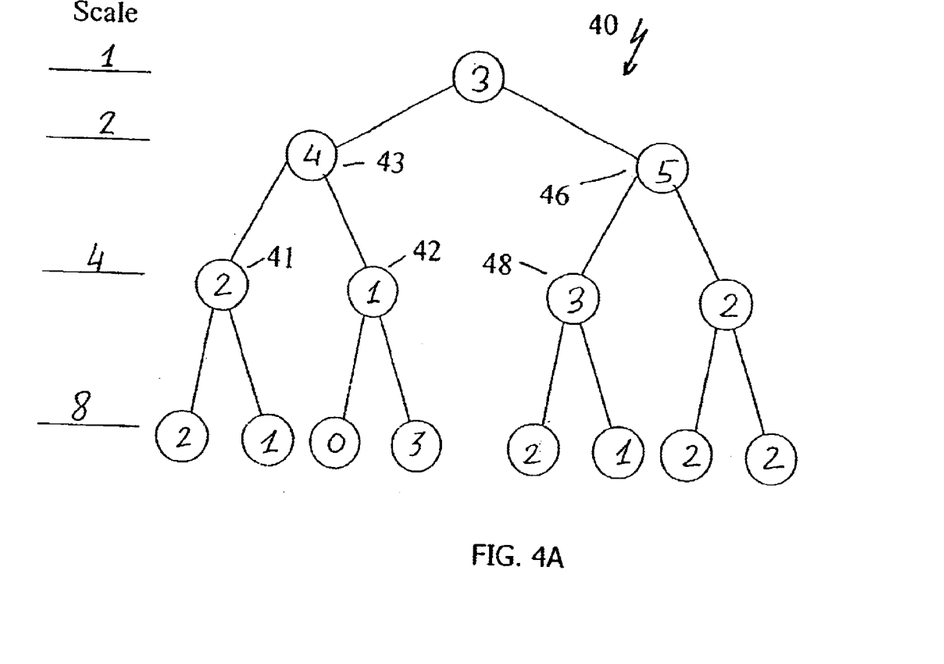
FIGS. 4A and 4B, show a tree of discriminating power map between car A and car B, and a discriminating pyramid between car A and car B respectively.

Such a tree of discriminating power map 40 that is shown in FIG. 4A, results from the tern-wise subtraction of the respective nodes of tree 30' of car B in FIG. 3B from the tree 30 of car A in FIG. 3A.

The bigger the value of a node in the tree of discriminating power map 40, the more pronounced is the difference between the vibration signatures of car A and of car B in the frequency band which is included in this node.

In tree of discriminating power map 40, when a sum of the values of two descendants nodes e.g. node 41 and node 42 is not bigger then a value of their parent node, e.g. node 43, the ability to discriminate car A from car B according to wavelet analysis of their vibrations does not improve any more by further splitting the frequency band of parents node 43 in order to achieve a better frequency resolution of the vibration signals.

From the other hand, a better frequency resolution requires further decomposition of a signal by the application of a wavelet with a bigger scale, which is a time and resources consuming process.

Thus, it is useful that a wavelet packet decomposition of a signal of an unknown object which has to be classified as being either car A or car B, should not be "over-extended" to produce wavelet transform coefficients which can not add any more to the discrimination between the signals.

Rather, a signal from a vibrating target which is either car A or car B, can be a-priory be decomposed by the appropriate wavelet members of the packet which consists of the "most discriminating wavelet" between car A and car B.

Knowing a "most discriminating wavelet" is equivalent to the knowing of at least one best discriminating frequency band in which a differentiation between vibration spectra of car A and car B cannot be improved by splitting the frequency band to sub-bands.

The way in which the most discriminating frequency bands are identified will now be explained:

Node 43 is a member of "terminal nodes" in the tree of discriminating power map 40, which are defined herein as nodes in the difference wavelet decomposition tree of a couple of objects whose value is bigger or equal then the value of its descendant nodes.

In tree of discriminating power map 40 shown in FIG. 4A, terminal nodes are nodes 43, 46 and 48.

To find the terminal nodes the tree of discriminating power map is scanned for terminal nodes going from the bottom of the tree upwards. The terminal nodes found are arranged in a pyramidal structure (i.e. having a scale and a numerical value) according to their position in the scanned tree of discriminating power map.

Figure 4B:
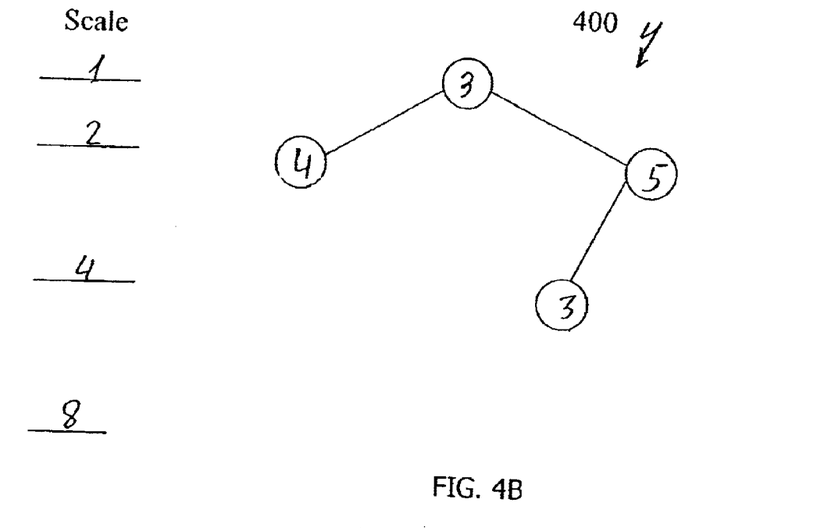

The arranged structure of the terminal nodes is termed hereinafter as a discriminating pyramid 400 shown in FIG. 4B, and it is the discriminating pyramid, e.g. that between car A and car B which is used in the present invention as a measure template to sort an unknown vibrating target among a couple of known objects.

To do so, the vibration spectrum of each member of the couple is collected at different conditions in field experiments, then the spectra are wavelet analyzed to find the most discriminating wavelets, the respective discriminating pyramid of the couple of the vibrating objects is established, and the immutable characteristics of each object of the couple are extracted within the most discrimination frequency bands.

When a vibration signal of an unknown signal is measured, it is analyzed by a wavelet transform at the most discrimination frequency bands (using the most discriminating wavelet) only, which already makes it possible to decide whether it is more likely to be a signal of car A or a signal of car B.

Correlation between the prediction according to the wavelet packet decomposition of a signal of a vibrating target and a category (or sub-category) of the target is accomplished by any known statistical mechanisms such as linear regression, nearest neighbor clustering, classification and regression tree (CART), chi-square automatic interaction detector (CHAID), decision trees and neural network empirical modeling.

In an automatic classification system, which is based on the method of the present invention, a database which includes the energies of signals at the respective most discriminating frequency bands as well as the discriminating pyramids of couples which are selected from a plurality of objects, is stored in a digital storage media such as a memory of a computer.

A signal of an unknown target to be classified is usually accompanied with a clue as to the category of the target, (e.g. a truck or a tank) which limits the scope of the search to a set of couples, which are included in the data base.

Beginning with the first couple of the set, the wavelet analysis and comparison of the incoming signal is automatically applied in the most discriminating frequency bands only, in order to reject the less favorite member of the couple, then a new couple is formed between the favorite member of the couple and a third object, the method is applied again (possibly using a different most discriminating frequency bands), and vice versa until the object within the database, with which the target can be correlated with the highest probability score is identified.

The method and system of the present invention which were described above are applicable to any use of laser Doppler vibrometry, either military or civic as described for example in P. Castelini, G. M. Revel "Laser vibration measurements and data processing for structural diagnostic on composite material", *Review of Scientific Instruments*, Vol. 71, No. 1, 207 (2000).

Besides, vibrations, which are handled by the method of the present invention, may also result as a consequence of acoustical, seismic and electromagnetic effects.

The target, which is identified according to the method of the invention, is a ground target, an airborne target or a sea vehicle.

The wavelet packet analysis according to the present invention is performed on signals acquired by a device positioned at a ground station, carried by a personal, located on a ground platform either stationary or mobile, on airborne vehicles or positioned on a sea vehicle.

While the invention has been described with respect to a limited number of embodiments, it will be appreciated that many variations, modifications and other applications of the invention may be made without departing from the spirit and scope of the invention.

What is claimed is:

1. A method for an automatic classification of a target among a plurality of objects according to the target vibration in the audio frequency range, the method comprises the stages of:
   (a) providing vibration signals from a first object and from a second object;
   (b) processing said vibration signals of both said first and said second object into respective vibration spectra by a wavelet packet transform;
   (c) identifying at least one most discriminating frequency band in which a difference between said vibration spectrum of said first object and said vibration spectrum of said second object are mostly pronounced;
   (d) choosing a spectral resolution for which a discrimination between said vibration spectrum of said first object and said vibration spectrum of said second object cannot be further improved;
   (e) attributing immutable features to each of said vibration spectrum of said first and said second object within said most discriminating frequency band at said spectral resolution;
   (f) acquiring a vibration signal from the target;
   (g) ascertaining spectral features of said vibration signal of the target within said most discriminating frequency band at said spectral resolution, and
   (h) assigning a probability for the target for being either said first or said second object in accordance to a correlation score of said spectral features of the target with said immutable features of said vibration spectrum of said first object and said second object.

2. The method of claim 1 wherein said processing comprises the stages of:
   (i) selecting a mother wavelet for said wavelet packet transform of said vibration signals of both said first object and said second objects;
   (ii) calculating wavelet packet transform coefficients of said wavelet packet transform of said vibration signals of both said first object and said second objects, and
   (iii) building a tree of power map for said first object and for said second object.

3. The method of claim 2 wherein said processing is performed on a plurality of portions (slices) of said signals of said first object or said second object, further comprising the stages of:
   (iv) constructing a complete tree of power map for said first object and said second object.

4. The method of claim 3 wherein said identifying of said most discriminating frequency band comprises the stage of constructing a tree of discriminating power map between said complete tree of power map of said first object and said second object.

5. The method of claim 4 wherein a node in said tree of discriminating power map represents a frequency band.

6. The method of claim 5 wherein at least one said node in said tree of discriminating power map has two descendant nodes.

7. The method of claim 6 wherein each of said nodes in said tree of power discriminating map is assigned by a value which indicates a degree difference between said spectrum of said first object and said spectrum of said second object in said frequency band.

8. The method of claim 7 wherein said choosing of said spectral resolution includes the stage of selecting a terminal node among nodes in said tree of discriminating power map.

9. The method of claim 8 wherein said terminal node is a node in said tree of discriminating power map, which its said value is not smaller than a sum of said values of its said two descendant nodes.

10. The method of claim 1, wherein said vibrating signal of the target is selected from the group consisting of an optical signal, an acoustic signal and a seismic signal.

11. The method of claim 1 wherein said target is selected from the group consisting of a ground target, an airborne target and an aquatic target.

12. The method of claim 1 wherein said acquiring is effected using a Doppler LADAR device whose position is selected from the group consisting of onboard a ground platform, onboard an airborne vehicle and onboard a sea vehicle.

13. The method as in claim 3 wherein said at least portion of said signal of said first object and said spectrum of said second object includes between about 16 to about 4092 data points.

14. The method as in claim 1 wherein said correlation uses statistical techniques selected from the group consisting of linear regression, nearest neighbor, clustering, classification and regression tree (CART), chi-square automatic interaction detector (CHAID), decision trees and neural network empirical modeling.

15. A Doppler Ladar vibrometry system for automatic classification of a target among a plurality of objects, comprising of:
   (a) a Doppler Ladar device to acquire a vibration signal of the target;
   (b) a database which includes wavelet packet transform coefficients of vibration signatures of a plurality of objects;
   (c) a first mechanism to establish a most discriminating frequency band in which maximum distinction exists between said vibration signatures of members of a couple of objects which is selected from said plurality of objects;
   (d) a second mechanism for choosing a spectral resolution for which a discrimination between said vibration signature of said members of said couple within said most discriminating frequency band cannot be further improved;
   (e) a third mechanism to extract a characteristic feature of the vibration signal of the target within said most discriminating frequency band at said spectral resolution, and
   (f) a fourth mechanism to classify the target among said members of said couple of objects in accordance to a correlation score between said characteristic feature of said vibration signal of the target, and an immutable characteristic of either of said members of said couple of objects at said spectral resolution within said most discriminating frequency band.

16. The system of claim 15 wherein a position of at least a component of the system is selected from the group consisting of onboard a ground platform, onboard an airborne vehicle and onboard a sea vehicle.

17. The system of claim 15 wherein said target is selected from the group consisting of a ground target, an airborne target and an aquatic target.

18. The system of claim 15 wherein said database is stored in a digital storage media of a computer.

19. The system of claim 15 wherein said first mechanism includes a code for a formation of a complete tree of power map of said first object and said second object.

20. The system of claim 19 wherein said first mechanism includes a code for a formation of a tree of discriminating power map between said complete tree of power map of said first object and said complete tree of power map of said second object.

21. The system of claim 20 wherein a node in said tree of discriminating power map represents a frequency band.

22. The system of claim 21 wherein said node in said tree of discriminating power map is assigned by a value which indicates a degree of difference between said vibration signatures of said members of said couple of objects in said frequency band.

23. The system of claim 22 wherein at least one said node has two descendant nodes.

24. The system of claim 23 wherein said second mechanism includes a code for finding terminal nodes in said tree of discriminating power map.

25. The system of claim 24 wherein said terminal nodes are nodes in said tree of discriminating power map which include nodes having values which are greater or equal than a combined value of their said two descendant nodes.

26. The system of claim 15 wherein said third mechanism includes a software for wavelet analysis of said vibration signal of said target.

27. The system of claim 15 wherein said fourth mechanism includes a statistical technique selected from the group consisting of linear regression, nearest neighbor, clustering, classification and regression tree (CART), chi-square automatic interaction detector (CHAID), decision trees and neural network empirical modeling.

* * * * *